(12) United States Patent
Tovino et al.

(10) Patent No.: US 8,490,020 B2
(45) Date of Patent: Jul. 16, 2013

(54) PROGRAMMABLE BUTTONS FOR TELEPHONE USER INTERFACE

(75) Inventors: Michael S. W. Tovino, Bend, OR (US); Glen K. Okita, Los Altos, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 772 days.

(21) Appl. No.: 12/034,892

(22) Filed: Feb. 21, 2008

(65) Prior Publication Data

US 2009/0217180 A1  Aug. 27, 2009

(51) Int. Cl.
*G06F 3/048* (2006.01)
(52) U.S. Cl.
USPC ........... 715/840; 715/835; 715/839; 715/861; 715/977
(58) Field of Classification Search
USPC .................. 715/840, 839, 835, 861, 977
See application file for complete search history.

(56) References Cited

U.S. PATENT DOCUMENTS

| | | | | |
|---|---|---|---|---|
| 5,309,509 A * | 5/1994 | Cocklin et al. | ................. | 379/165 |
| 5,737,393 A * | 4/1998 | Wolf | ................. | 379/88.13 |
| 5,796,394 A * | 8/1998 | Wicks et al. | ................. | 715/751 |
| 5,797,098 A | 8/1998 | Schroeder et al. | | |
| 5,877,746 A * | 3/1999 | Parks et al. | ................. | 345/156 |
| 6,018,571 A * | 1/2000 | Langlois et al. | ......... | 379/201.04 |
| 6,057,836 A * | 5/2000 | Kavalam et al. | ................. | 715/779 |
| 6,125,287 A | 9/2000 | Cushman et al. | | |
| 6,169,911 B1 | 1/2001 | Wagner et al. | | |
| 6,215,515 B1 * | 4/2001 | Voois et al. | ................. | 348/14.01 |
| 6,282,435 B1 | 8/2001 | Wagner et al. | | |
| 6,366,653 B1 * | 4/2002 | Yeh et al. | ................. | 379/93.05 |
| 6,421,068 B1 * | 7/2002 | Ingrassia et al. | ................. | 715/762 |
| 6,757,363 B1 * | 6/2004 | Platt et al. | ................. | 379/88.11 |
| 6,819,343 B1 * | 11/2004 | Sobeski et al. | ................. | 715/848 |
| 6,989,820 B1 * | 1/2006 | Baker et al. | ................. | 345/172 |
| 7,012,915 B1 * | 3/2006 | Carr | ................. | 370/352 |
| 7,123,700 B1 * | 10/2006 | Weaver et al. | ................. | 379/88.19 |
| 7,167,898 B2 * | 1/2007 | Sato et al. | ................. | 709/204 |
| 7,225,409 B1 * | 5/2007 | Schnarel et al. | ................. | 715/747 |
| 8,069,205 B1 * | 11/2011 | Voois et al. | ................. | 709/204 |
| 2002/0063734 A1 * | 5/2002 | Khalfay et al. | ................. | 345/744 |
| 2003/0105804 A1 * | 6/2003 | Turner et al. | ................. | 709/203 |
| 2004/0186775 A1 * | 9/2004 | Margiloff et al. | ................. | 705/14 |
| 2004/0192378 A1 * | 9/2004 | Wulkan | ................. | 455/555 |
| 2004/0240650 A1 * | 12/2004 | Bear et al. | ................. | 379/142.01 |
| 2005/0039144 A1 * | 2/2005 | Wada et al. | ................. | 715/840 |
| 2005/0117737 A1 * | 6/2005 | Stanford et al. | ................. | 379/387.01 |
| 2005/0132045 A1 * | 6/2005 | Hornback et al. | ................. | 709/225 |
| 2005/0180403 A1 * | 8/2005 | Haddad et al. | ................. | 370/352 |
| 2006/0050686 A1 * | 3/2006 | Velez-Rivera et al. | ........ | 370/352 |
| 2006/0177009 A1 * | 8/2006 | Skakkebaek et al. | ........ | 379/67.1 |
| 2006/0242712 A1 * | 10/2006 | Linn et al. | ................. | 726/26 |
| 2007/0033382 A1 * | 2/2007 | Mandalia et al. | ................. | 712/23 |
| 2009/0129574 A1 * | 5/2009 | Erb | ................. | 379/201.02 |

\* cited by examiner

*Primary Examiner* — Kieu Vu
*Assistant Examiner* — Eric J Bycer
(74) *Attorney, Agent, or Firm* — Kilpatrick Townsend & Stockton LLP

(57) ABSTRACT

A graphical user interface for a telephone system includes programmable buttons which may be customized for individual users or groups of users. The programmable buttons enable user specific functionality to be provided, for example, enabling a button to be defined to record a call at a particular extension with one touch. The programmable buttons are collected onto toolbars and displayed on the user interface.

14 Claims, 3 Drawing Sheets

Programmable Buttons

FIG. 1
(PRIOR ART)

FIG. 2 – Programmable Buttons

FIG. 3 – Program Interface

PROGRAMMABLE BUTTONS FOR TELEPHONE USER INTERFACE

BACKGROUND OF THE INVENTION

Modern telephones now have the capability of implementing wide ranges of features such as speed dial, intercom, conference, transfer, etc. These features are typically provided by the telephone vendor, and accordingly have general applicability to wide classes of users of the telephone. With the exception of speed dial programmability, however, the features are not able to be customized for particular individual users or small groups of users. For example, a typical office telephone, whether conventional or voice-over-internet-protocol (VOIP) includes a large number of buttons which, when activated, implement particular features designated by the system vendor, such as mute, conference, hold, and the like. They sometimes also include a number of buttons—"speed dial buttons"—which may be programmed by the user to dial specific telephone numbers.

Implementation of functionality beyond that built into the telephone system at the time of sale typically involves memorizing detailed keystroke sequences, such as *9# to transfer a call to a subsequently-entered extension. Remembering these keystroke sequences can be frustrating, and results in all but the most commonly used functionality being ignored. There is essentially no easy way for a user or a system administrator to implement user specific functionality or even small user group specific functionality for a telephone system.

Another limitation of conventional telephone interfaces is that they do not provide feedback on real-time call state or current configuration of the function associated with the speed dial. Speed dialing is typically limited to functions controlled by a central telephone switch. As a result, there is no ability to program functions that affect the device, such as mute or the user interface, or to program non-telephony functionality, such as opening windows or invoking an Internet URL.

More recent telephony systems provide a "soft" client allowing control of calls from a display screen, e.g., ShoreTel's™"Personal Call Manager"™ or Cisco Systems™ "Unified Personal Communications Console."™ Other telephony-enabled clients are available that integrate Instant Messaging and IM Presence, e.g. Microsoft™ "Office Communicator 2005"™ or Skype™. These systems provide a user interface that appears on a user's display screen. Such approaches allow dialing an extension by entering the name of the person to call, as well as other features such as speed dial. These systems, however, do not allow a user of an extension, or even a system administrator for that system, to define custom functionality for a particular button or buttons on a computer or similar device that is not physically a part of the telephone itself.

BRIEF SUMMARY OF THE INVENTION

This invention enables customization of a user interface for a telephone when that user interface is provided on a personal computer, mobile interface, or other similar device coupled to the telephone system. The advantages of using the coupled device interface instead of the physical phone include the availability of a more complete alphanumeric keyboard, a larger display, or a portable wireless device, etc. The system enables a user or an administrator to program custom functions associated with individual buttons and sets of buttons to form toolbars to be displayed on the coupled device screen and thereby implement specific functionality for individual users or groups of users. For example, a user or administrator can program a button on the computer user interface to record a call at a specific extension. Typically, the invention is implemented by using toolbars which include buttons (or other appropriate user interface icons) in which each button may be programmed to implement specific functionality, such as desired by individual users or small groups of users. Instead of a toolbar, other user interfaces, such as a tool box dialog or dynamic menus, may be used to show a customized collection of functions. Preferably users or administrators can add "speed operation" buttons such as "record call at extension 5203, and send the recording to extension 4523," "transfer to external number 803-555-6767," "monitor call activity at the accounting department," "show Instant Messaging presence for a specific contact," etc. This specific customization to individual users' desired functionality can enable increases in convenience and productivity for users of such telephone systems.

This invention allows a system administrator and/or end users to define custom functions which are associated with abstract "buttons" or similar user interface indicators which are embodied as custom toolbar buttons on a client application running on a computer or mobile device such as a smart phone which is coupled to the telephone system. Each button, dynamic button, menu, or other user interface widget on the display screen implements a function, optionally coupled with one or more parameters such as a telephone number, and optionally endowed with properties like "presence," to indicate that the feature is performing its function.

DETAILED DESCRIPTION OF THE INVENTION

Figure 1:
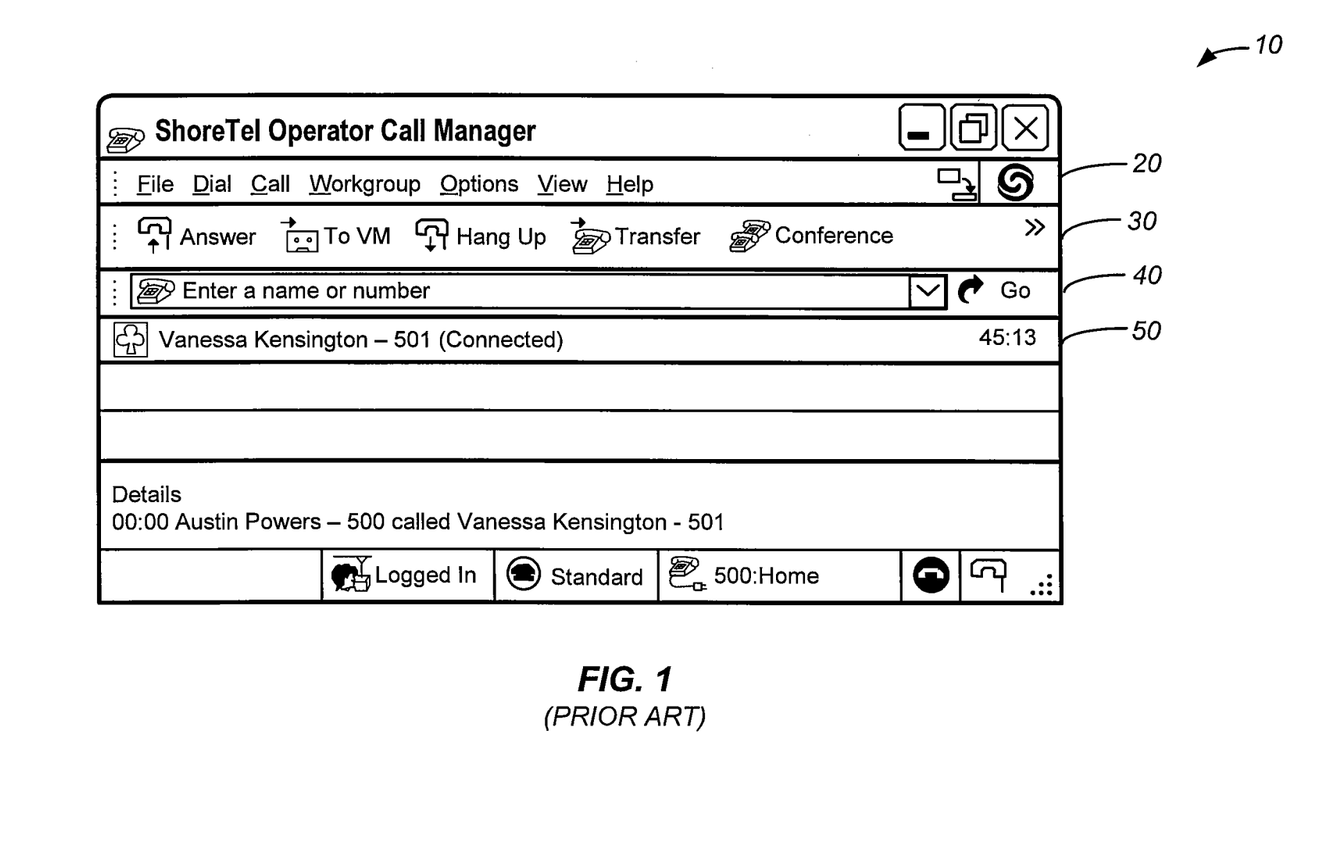
FIG. 1 illustrates a soft client running on a personal computer coupled to a desk telephone.

FIG. 1 illustrates a soft client user interface as running on a personal computer coupled to a user telephone. Illustrated is a soft client 10, i.e., a screen on a computer for a user to control her telephone. The user interface includes a conventional "Windows" menu bar 20, enabling selection of various system wide functions. A system wide standard toolbar 30 is also shown. Toolbar 30 includes standard system-wide functionality such as "hang-up," "transfer" etc. Another row 40 on the display allows dialing the phone with only the name of the person desired to be called. Finally a row 50 shows that a call is underway. The client interface presented is specific to the user and independent of the coupled device. If a user logs out of a computer and a different user logs in, the subsequent user receives an interface customized to their own personal and group configuration.

Figure 2:
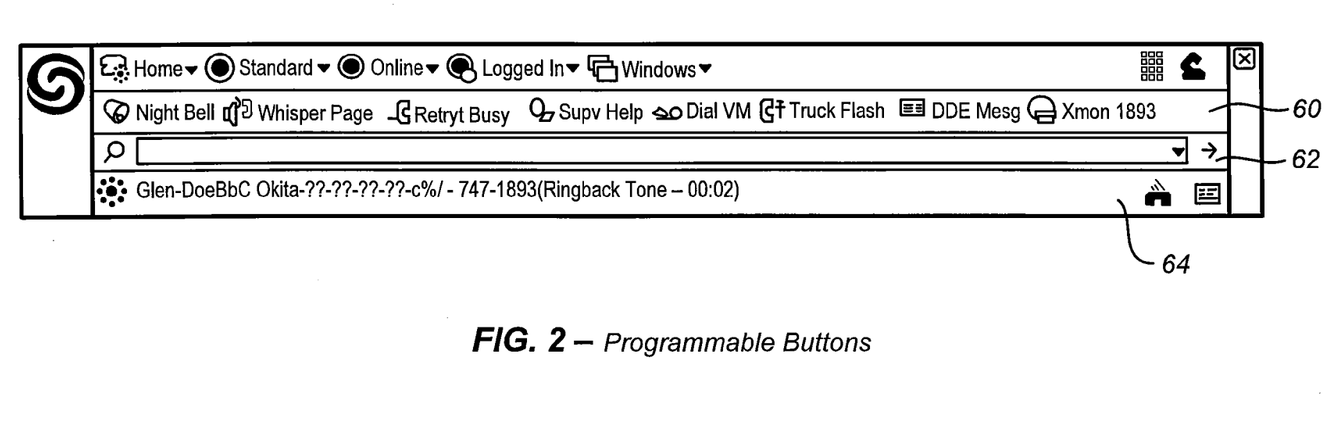
FIG. 2 illustrates programmable buttons as provided by this invention.

FIG. 2 illustrates an exemplary embodiment of the invention in the context of the soft client 10, i.e., a screen on a desk telephone unit or on a personal computer for a user to control her telephone. In FIG. 2 an additional toolbar 60 has been defined to include specific features desired by the user of the interface. As shown, toolbar 60 includes specific buttons to perform functions "Night Bell" [ring a chime for after hours calls], "Whisper Page" [page a particular user where the other party talking to the user cannot hear the page], "Retry Busy" [add an outbound Contact Center call to a list of calls to retry later], "Supv Help" [call the supervisor for a Contact Center agent], "Dial VM" [dial a specified extension to leave a message without ringing the extension], "Trunk Flash" [Send a flash signal out the trunk associated with the call], "DDE Mesg" [Send a Windows DDE message that can contain information from the active call], "XMon 1893" [Monitor call activity at extension 1893], and "Record 1893" [Record call at extension 1893 and send the recording to extension 1762]. Below row 60 is a row 62 which enables a search engine function. Below row 62, row 64 shows that a call with Glen Okita at 747-1893 is underway.

In a preferred embodiment toolbar 60 is defined on a per-user or per-group-of-users basis. As shown, the toolbar 60 is configured to have a multiplicity of programmable buttons or similar devices, and these buttons can be user specific or specific to a small group of users. The specific functionality of each button is programmed to implement the desired function, either with or without one or more parameters, such as an extension (or other telephone number). In some cases the button implements a function with a prompt to the user to enter one or more parameters. The buttons assembled into groups on toolbars. Each toolbar can be provided as a separate row in the user interface, or multiple toolbars may share a row, depending upon the geometry of the interface. Particular toolbars may be shown or hidden by the user by performing various steps with the device to which the telephone system is coupled.

Generally, the toolbar 60 settings are saved in a database and can therefore be moved from computer to computer, for example, if a user is reassigned to a different department in a company. In one implementation the administrator of the telephone system defines the toolbars and then assigns them out to users or groups of users requesting them. The buttons on a given toolbar may combine an operation or function with a parameter or parameters, thereby allowing one-click access to commonly performed operations, for example, transferring a call from a user to a defined extension in the accounting department. In addition, extension monitor or bridged call appearance buttons can be created, providing visual cues that a conference call is under way, an extension is being monitored, or other similar features. Buttons can also be created to execute software functions, for example browse a particular URL-initiated data transfer with a server, provide additional information to a person receiving a call based on the caller ID number, and other such features. Preferably, each toolbar is given a unique name, enabling the users to show or hide the toolbars as preferred.

Table 1 below illustrates typical functionality that can be implemented using the programmable buttons.

TABLE 1

Examples of Functionality of Buttons on the Programmable Toolbar

| FUNCTION | TARGET | TARGET VALUES | STATE ICONS | DESCRIPTION |
|---|---|---|---|---|
| Add/Modify Contact | Not Allowed | None | | Opens window allowing user to edit their personal contacts. |
| Agent Login | Not Allowed | None | | Logs a Workgroup agent into all their assigned groups. A workgroup is an automatic call distribution feature. |
| Agent Logout | Not Allowed | None | | Logs a Workgroup agent out of their assigned groups. Calls will no longer be sent to this agent. |
| Agent Wrap-Up | Not Allowed | None | | Puts a Workgroup agent in Wrap Up state. This allows an agent to work after a call ends without immediately getting a new call. |
| Answer | Not Allowed | None | | Answers an incoming call. |
| Answer Call Center Call | Not Allowed | None | | Answers a call for a Contact Center agent. A contact center agent can receive voice, video, email, and chat "calls". |
| Assign to last External # (OA/E) | Not Allowed | None | | Assigns your extension to an external number, such as a cell phone. It uses the last number that was assigned. |
| Barge In | Optional | Extension, None | In Use | Allows caller to join another call in-progress at another extension. That is, a private 2-way call becomes a 3-way conference that includes the person barging in. The "in use" indicator means that an active call exists at the target extension. |
| Blind Transfer Agent | Optional | Agent ID | | Blind transfer a Contact Center call to another agent. The "call" may be voice, video, email, or chat. |
| Bridged Call Appearance | Required | BCA Extension, Call Stack Position | Offering, In Use, Conference | A bridged call appearance allows multiple extensions to see call activity for a shared extension. Calls on hold can be unparked to any phone sharing the extension. More than one call can be parked at an |

TABLE 1-continued

Examples of Functionality of Buttons on the Programmable Toolbar

| FUNCTION | TARGET | TARGET VALUES | STATE ICONS | DESCRIPTION |
|---|---|---|---|---|
| | | | | extension, and each active call is assigned a position in a "call stack". The button shows activity for a particular call stack position. |
| Centrex Flash | Not Allowed | None | | Does a flash on the trunk associated with the current call. Used to signal a transfer with Centrex. |
| Change CHM | Optional | CHM to change to (1-5) | | CHM is the Call Handling Mode. CHM state defines how calls are forwarded when busy or no answer. If calls go to voice mail, each CHM may have a different greeting. If not target is specified, the current CHM state is displayed. |
| Change Default audio Path | Required | Speaker, Headset, Headset Lifter | | Changes default audio path |
| Conference | Not Allowed | None | In Use | Connects other users to a call |
| Conference Blind | Optional | Extension, External Number, None | In Use | If the target is an extension, then call activity is shown with the state icon. If the target is an external number, and the external number matches a contact with IM presence, then the "in use" indicator tracks the IM presence associated with the contact. |
| Conference Consultative | Required | Extension, External Number | In Use | If the target is an extension, then call activity is shown with the state icon. If the target is an external number, and the external number matches a contact with IM presence, then the "in use" indicator tracks the IM presence associated with the contact. |
| Conference Intercom | Optional | Extension, None | In Use | Create a conference and intercom the party joining the conference. |
| Consult Transfer Agent | Optional | Agent ID | | Consultative transfer a Contact Center call to another agent. The "call" may be voice, video, email, or chat. |
| Dial Mailbox | Optional | Extension, None | In Use | Enters voice mail for the target extension. Allows leaving a voice message without ringing the extension. |
| Dial Number (Speed Dial) | Required | Extension, External Number | In Use | If the target is an extension, then call activity is shown with the state icon. If the target is an external number, and the external number matches a contact with IM presence, then the "in use" indicator tracks the IM presence associated with the contact. |
| Edit Call Note | Not Allowed | None | | Opens window allowing user to edit the call note. The call note is a free-form text field that follows the call from inception to termination. The call note is stored in the Call Detail Record database. |
| End Wrap-Up | Not Allowed | None | | Ends the Wrap Up state for a Contact Center agent. The agent will start to receive Contact Center calls. |
| Execute DDE command | Required, Required, Required | Command, Server, Topic (strings) | | Executes a DDE command. DDE is a Windows interprocess communication facility. DDE takes various parameters, and this command allows inserting call information |

TABLE 1-continued

Examples of Functionality of Buttons on the Programmable Toolbar

| FUNCTION | TARGET | TARGET VALUES | STATE ICONS | DESCRIPTION |
|---|---|---|---|---|
| | | | | (% string substitutions) from the active call into the DDE parameters. |
| Extend Wrap-Up | Not Allowed | None | | Extends time for wrap-up of call |
| Go Home | Not Allowed | None | | Assigns the user's extension to the main phone configured for them. Typically, this is their desktop phone. |
| Group Pickup | Optional | Group Extension, None | | Picks up an offering call from a set of phones configured as part of the group extension. |
| Hang Up | Not Allowed | None | | Ends the call |
| Help | Not Allowed | None | | Opens the online help window for Call Manager. |
| Hold | Not Allowed | None | | Holds the active call. |
| Intercom | Required | Extension | In Use | Places intercom call to an extension. |
| Invoke command line | Required, Optional | Path to app, working Directory | | Executes a program with command line arguments. The command can be interpolated with % string substitutions containing information from the active call. |
| Invoke URL | Optional | URL | | Invokes the default Internet browser with a URL. The URL can be interpolated with % string substitutions containing information from the active call. |
| Login Group | Optional | Group Name | | Login Contact Center agent to a specific group to start receiving calls for that group. |
| Login Primary Groups | Not Allowed | None | | Login Contact Center agent to all configured groups. |
| Logout Group | Optional | Group Name | | Logout Contact Center agent from a specific group to stop receiving calls for that group. |
| Logout Primary Groups | Not Allowed | None | | Logout Contact Center agent from all configured groups. |
| Monitor Extension | Required | Extension | Offering, In Use, Conference | Shows call activity for the target extension. Allows configurable behavior based on call activity on the target extension. |
| Open Agent Monitor | Not Allowed | None | | Opens window showing Workgroup agents. |
| Open Conference Mgr | Not Allowed | None | | Opens window showing conference management controls and conference buddies. This is an Internet browser window. |
| Open Control Panel | Not Allowed | None | | Opens the Options dialog for the Call Manager. |
| Open Directory | Not Allowed | None | | Opens the Directory pane in the Call Manager. If it is already open, it sets focus to the Directory pane. |
| Open Extension Monitor | Not Allowed | None | | Opens the Contacts pane in the Call Manager. If it is already open, it sets focus to the Directory pane. |
| Open External Assignment dialog | Not Allowed | None | | Opens the External Extension Assignment dialog. |
| Open History Viewer | Not Allowed | None | | Opens the call history pane. |
| Open Queue Monitor | Not Allowed | None | | Opens window showing status of Workgroup queues. |
| Open Soft Phone | Not Allowed | None | | Opens a window with the soft phone. Assigns the current extension to the soft phone. |
| Open Voice Mail | Not Allowed | None | | Opens the voice mail pane. |
| Page | Not Allowed | None | | Invokes the site overhead paging feature. |
| Park | Optional | Extension, None | In Use | Puts the call on hold at the target extension. |

TABLE 1-continued

Examples of Functionality of Buttons on the Programmable Toolbar

| FUNCTION | TARGET | TARGET VALUES | STATE ICONS | DESCRIPTION |
|---|---|---|---|---|
| Park and Page | Optional | Extension, None | In Use | Parks the call and pages a user |
| Pickup | Optional | Extension, None | | Answers an offering call at the target extension. |
| PickUp Night Bell | Not Allowed | None | | Answers an offering call for the night bell. |
| Pickup/Unpark | Required | Extension | | Allows a user to pick up a parked call |
| Record Call | Not Allowed | None | | Records the current active call for a user. |
| Record Extension | Required | Extension | | Records a call at another extension. Normal recording is sent to the person doing the recording, but recording can also be sent to the voice mailbox of any other extension. |
| Reinsert Busy Call | Not Allowed | None | | When an outbound Contact Center agent reaches a busy number, allows the number to be reinserted for a later retry. |
| Reinsert Terminated Call | Not Allowed | None | | When an outbound Contact Center agent reaches a number and the other party hangs up, allows the number to be reinserted for a later retry. |
| Reinsert Unsanswered Call | Not Allowed | None | | When an outbound Contact Center agent calls a number and there is no answer, allows the number to be reinserted for a later retry. |
| Release with Code | Optional | Code | | Releases a call to a user |
| Resume/Release | Not Allowed | None | | Toggle button that controls whether a Contact Center agent is available to receive calls. When in Release mode, the agent is still considered logged in. |
| Run Contact Center App | Required, Optional | Path to app, working Directory | | Executes a program with command line arguments. The command can be interpolated with % string substitutions containing information from the active Contact Center call. A Contact Center call can be voice, video, email, or chat. |
| Send Digits Over Call | Optional (Req'd on phone) | Digits (None allowed on PCM) | | Send DTMF digits for the active call. |
| Set Agent ID | Not Allowed | None | | Change the agent associated with the existing extension of the Call Manager. This is used for "hot desk" scenarios where different Contact Center agents share the same extension. |
| Silent Monitor | Optional | Extension, None | In Use | Similar to Barge In, above, except that the silent party cannot speak into the call, and the original participants are not aware that the silent party has joined. |
| Supervisor Help | Not Allowed | None | | Requests help |
| To AA | Not Allowed | None | | Send active call to the Auto Attendant. |
| To VM | Not Allowed | None | | Send active call to the user's voice mail. |
| Toggle Handsfree | Not Allowed | None | | Handsfree mode suppresses dial tone when off-hook. It allows a headset to be used with an analog phone. |
| Transfer | Not Allowed | None | In Use | Transfers a call |
| Transfer Blind | Optional | Extension, External Number, None | In Use | Transfers a call without indicating source of transfer |
| Transfer Consultative | Optional | Extension, External Number, None | In Use | Transfers a call but allows transferring extension to remain on the call |

TABLE 1-continued

Examples of Functionality of Buttons on the Programmable Toolbar

| FUNCTION | TARGET | TARGET VALUES | STATE ICONS | DESCRIPTION |
|---|---|---|---|---|
| Transfer Intercom | Optional | Extension, None | In Use | Consultative transfer, where the consult call is placed using the Intercom feature. |
| Transfer to Mailbox | Optional | Extension, None | In Use | Transfer active call to a voice mailbox directly. This bypasses any call forward conditions of the target. |
| Transfer Whisper | Optional | Extension, None | In Use | Consultative transfer, where the consultative call is placed using the Whisper feature. |
| Unpark | Optional | Extension, None | | Releases a call for handling |
| Unused | Not Allowed | None | | Becomes a separator on the toolbar. |
| Whisper Page | Optional | Extension, None | In Use | Pages a user without the other party to the call hearing the page |
| Whisper Page Mute | Not Allowed | None | | Allows the target of a whisper page to talk back to the person that initiated the whisper. In this case, the far-end party of the whisper target cannot hear the conversation. This is a toggle button. |
| Wrap-UpCode | Optional | Code | | Allows entering a wrap-up code for the current call. This may be done during the call, or after the call has ended. |

As shown in the table above, each programmable button on the toolbar 60 may be programmed to have a particular function listed in the left hand column of the chart. For some functions an extension or telephone number parameter is required, while for others parameters are optional, or not permitted. The particular types of parameter values for a function are shown in the third column. Some functions include an indication that that functionality defined by that button is in use, for example, by changing the color of the button. An example of that is the conference intercom button. The appearance of the button changes when the target extension associated with the button is in use. Of course, other desired features can be implemented in the same manner as those depicted.

In a preferred embodiment, the parameters supplied at configuration time are validated. For example, a function to transfer to extension 3452 cannot be configured if that extension does not exist in the system. Validation can be performed for the parameter types stored in the telephony system database, such as extensions, Call Handling Modes (CHM), Contact IDs, Agent IDs, etc. A parameter can be supplied and validated, but a later action may create a conflict with the original configuration. In a large system it is difficult for a user or administrator to keep track of all references of this extension. For example, a function to transfer to an existing extension 2345 can be configured. Later, one may try to delete extension 2345. At the time of attempted deletion, there are two ways to handle the conflict. One way is to prevent the deletion from occurring until all references to it are removed. If there are many references to an extension, this can be tedious. A preferred approach is to warn the administrator that the extension is referenced, provide a list of the references, and offer the option to automatically remove all the references to the extension. If the removed extension is an optional parameter, the button function is retained but the parameter is removed from the configuration. If the button has the extension as a required parameter, the button is automatically converted to an "unused" function. When the warning is presented, the administrator also has the option to cancel the delete or other operation that would create a conflict.

In another case, an extension or other value supplied as a parameter may be changed. Consider the same transfer to extension 2345 case above. It is also possible to change an extension from 2345 to 3456. In this case, any references to extension 2345 are automatically changed to refer to extension 3456.

Some of the configurable buttons have optional parameters. If all parameters associated with the function are supplied by the user or administrator at configuration time, then that action is performed when the button is pressed with no further user interaction. On the other hand, if the one or more parameters are not supplied, then an appropriate dialog box may be caused to appear so the user can supply the missing parameters. Where possible, parameters supplied by the user interactively are validated, or a selection box is provided that only contains valid choices. As one example, if a "transfer blind" button without a parameter is pressed, a dialog box appears requesting the extension to which the call is to be transferred. Only extensions that are currently available and valid may be selected using the dialog.

To enable toolbars having fewer than a specified number of configurable feature buttons or other desired icon types, an "unused" function is provided. Any group of "unused" buttons at the start or end of the list are ignored by the telephone system, of if they appear between "used" buttons, then they are interpreted as a divider for a toolbar. Thus, a user can have as few or as many programmable buttons as she desires or a system administrator permits. In another embodiment, an "unused" function is not necessary and the list of functions associated with a toolbar can be inserted or deleted individually.

In the preferred embodiment up to four toolbar layouts may be configured for each user. The layouts are ordered; the first layout applies to the first toolbar, etc. If a user with multiple layouts is assigned to a phone with fewer toolbars, that user will only see the buttons in the number of layouts available. Conversely, if a user with fewer layouts is assigned to a phone with more toolbars, the extra toolbars will be empty.

Figure 3:
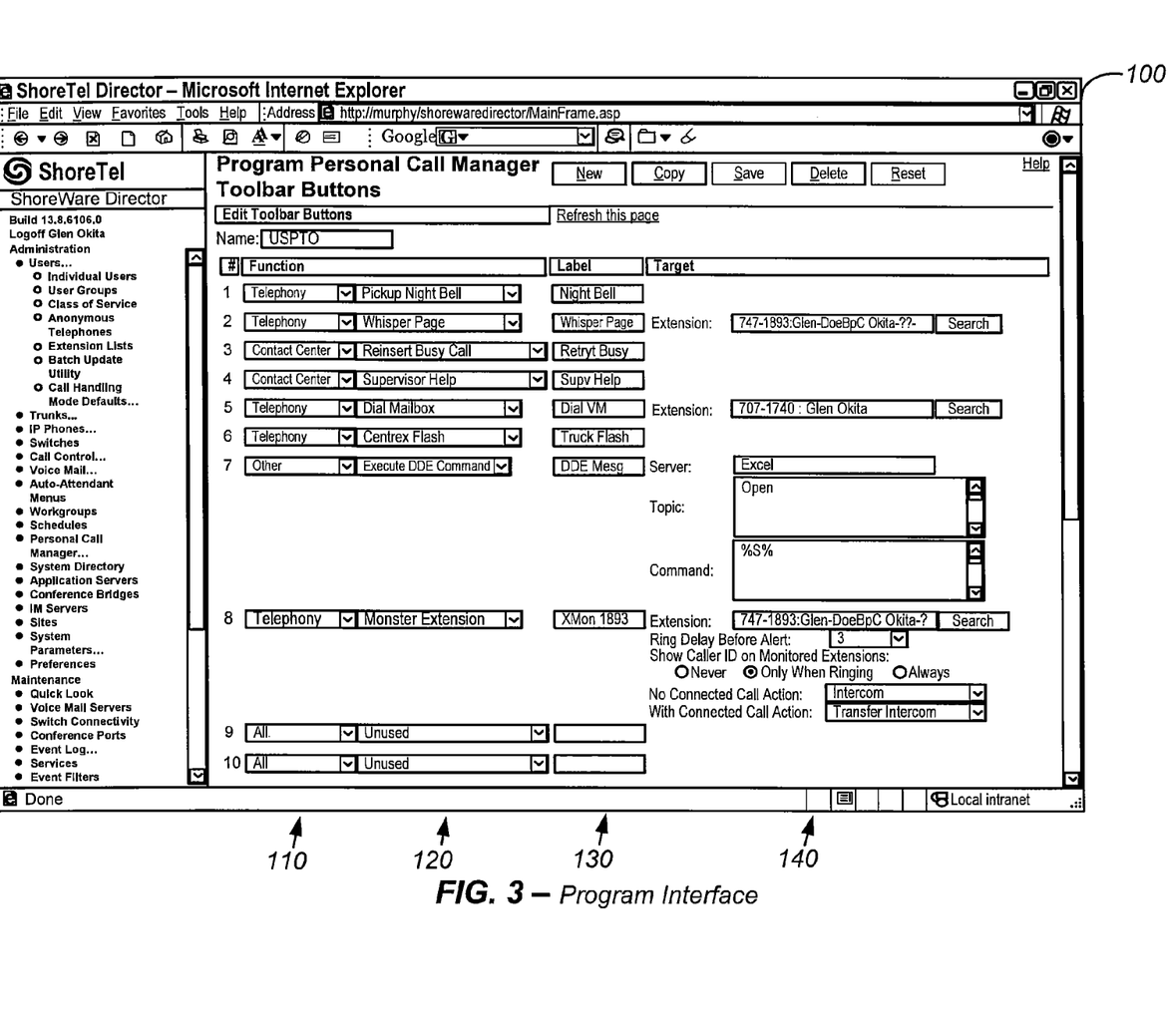
FIG. 3 illustrates an interface for programming buttons such as illustrated in FIG. 2.

The button layout configuration illustrates a toolbar, enabling the administrator to individually configure each button. Buttons may be left empty. FIG. 3 is a screenshot of an interface 100 which enables setting the following for each button:

Button function 110 and 120
Button label 130
Button parameter 140 (see Table 1 above)

The button label appears adjacent to the button when it appears in the toolbar. In some cases, button labels can be selectively hidden in the toolbar. A button label can have an option to be shown always, shown if there is room in the toolbar, or not shown. When dynamic buttons are shown as a menu, the button label is always displayed.

Row 5 in interface 100 illustrates programming of a programmable button for a toolbar named "USPTO." In row 5 a "Telephony" category has been selected. Categories are used to simplify presentation of the list of available functions by only showing functions that belong to a given category. A function may belong to more than one category. There is also the ability to show all functions in a single list. The function chosen is "Dial Mailbox," a function to allow the user to dial his voicemail box. The programmable button will be labeled "Dial VM." The target telephone number is 707-1740, that of Glen Okita. As illustrated the interface includes a search function to allow the programmer to search for a particular target telephone number.

Row 8 in the interface 100 illustrates an extension monitor function by which telephone 747-1893 is to be monitored. For extension monitor functions, as shown, the number of ring cycles before playing audible ringing, a default "no connected call" action, a default "connected call" action are also specified.

A series of Extension Monitor buttons are also provided. Extension Monitor buttons have additional parameters. In a preferred embodiment these Extension Monitor parameters are:

Show caller ID name and number always, only when call if offering, or never.
Number of rings cycles before playing audible ringing.

Furthermore, if the Extension Monitor button is pressed during a Transfer, Conference, or similar operation that is prompting for a number, the extension is used as the number. If the button is pressed when a call is offering on the monitored extension, the call is picked up. If the button is pressed when a call is held or parked on a monitored extension, the call is un-parked.

The visual state may reflect more than enablement of that function. For example, a "hang up" button may be grayed out if it is disabled. Each Extension Monitor button has a user-editable label and depicts the current status of the monitored extension. When the cursor is placed over the Extension Monitor button, a summary tool tip of the status of the monitored extension is provided. In a preferred embodiment this includes the name of the user, the state of the extension, the state of any other calls awaiting that user's attention, and other features as desired.

The action taken when a user presses an Extension Monitor button depends upon the current status of that extension, the user's own extension, and, of course the system programming. The two configuration options for Extension Monitor buttons are shown in Table 2 below:

TABLE 2

Extension Monitor Buttons

| | |
|---|---|
| No-selected-call action - one of the following: | None |
| | Dial Number |
| | Intercom |
| | Whisper Page |
| Selected call action - one of the following: | None |
| | Dial Number |
| | Intercom |
| | Whisper Page |
| | Transfer Blind |
| | Transfer Consult |
| | Transfer Intercom |
| | Transfer Whisper Page |

When the user presses an Extension Monitor button, the program logic decides what actions to take. If there is more than one call on the monitored extension, the oldest call is answered. If there are held or parked calls on the extension, then the oldest held or parked call is processed. There is also an option to present a list of the calls held or parked and allowing the user to select which one to connect. Otherwise, if there is an active call on the user's own extension that is selected in the user interface, the "selected call action" is performed on that call, with the monitored extension as a target. Finally, otherwise, the "no selected call" action is performed, with the monitored extension as a target. Status of the monitored extension or contact can also affect the action of pressing the button. For example, if the extension is in an active call the function can be configured to send an IM message instead of placing a call.

Another special button provided by this invention is a "Bridged Call Appearance" button. These are buttons which by their visual state reflect more than being enabled or disabled. They also have a user editable label. These buttons are configured with an extension and stack position as a target. When a cursor us placed over one of them, it shows a summary of the status, namely the state and duration of the calls on that extension. In addition to the Extension Monitor and Bridged Call Appearance buttons, several other buttons are enabled to present information about a current state of that feature. For example, for pick up and unpark functions, if a there is a call to be picked up or unparked, the state, duration, and preferably connected party information of that call are displayed. Similarly, if the extension is in use, that will be displayed.

Administration of the toolbars containing the programmable buttons can be performed by individual users; however, preferably the toolbars are managed by a system administrator. In a preferred embodiment, the system administrator configures the programmable buttons on the toolbar to provide both group toolbars and personal toolbars. The group toolbars, once created, are assigned to user groups so that each user in the group has access to the common toolbar. Such a toolbar typically includes common functions for that group, for example, enabling inventory to be checked, accounting to be conferenced onto the call, shipping to be notified, etc. The group toolbars are made available to all of the users in a designated group. For most toolbars, each user can choose to hide or display that toolbar. In some embodiments, the administrator has the option to require a group or personal toolbar to be shown in the GUI.

If the personal toolbars are to be programmed by the users, the personalized toolbars are implemented by providing users with links to a screen where the individual toolbar can be configured, for example, with a drag-and-drop interface, prompts for extension numbers, etc. The screen can be implemented as a conventional dialog or as a Web page. The buttons can be pre-defined to have standard icons; however, user-designed or user-selected icons may also be employed. Conventional drag-and-drop or other user interface technology can be used to enable the user to configure the toolbars with the programmable buttons. Of course, copies of commonly used toolbars or buttons can be stored on the system, enabling the user to select from among predefined lists. If users wish to change a button's icon, various approaches are provided. For example, user-supplied icons can be provided in .BMP format, and with the same color depth and using the same color palette as the application-supplied icons. Users can also provide their own icon artwork for any programmed button.

In some embodiments, the function of a button occurs in a separate associated system. The associated system is integrated using inter-process communication that allows status and commands to be exchanged between the telephony system and the other system. In a preferred embodiment, the interface to the Contact Center integration is offered by an Active-X control. The Active-X control does inter-process communication with a Contact Center system to perform functions specific to this feature. In operation, when the client application is first activated, the users system determines if it is a Contact Center client. If so, it instantiates the Agent Toolbar ActiveX control, and then verifies that the control is version compatible. After the control has been initialized, the client calls appropriate methods to initialize the system.

During this process, the Contact Center programmable buttons features are installed and initialized. The functionality includes that shown in Table 4 below.

If any button is programmed with an invalid argument, the function will behave as if the argument was not supplied. In this case, the Agent Toolbar will open a dialog to collect a valid argument. An enabled option is shown with an enclosing box (XP style), or in a pushed-un-pushed state. Some of the buttons on the toolbar may be toggle buttons. A toggle button has on and off behavior, such as mute and un-mute of a phone. The toggle button has real-time update where changing the state of mute using the button on the phone is also reflected in the GUI display, and vice-versa. Other states that are shown in synchronized fashion across multiple devices include CHM state, call forward always condition, agent login/logout, whisper page mute, and toggle hands-free mode.

As mentioned above, in the preferred embodiment the programmable buttons can be configured by a system administrator or a user employing various well known programming tools. In the example below we assume a system administrator configures the buttons, however, as will be apparent the description is equally applicable to a user configuring the buttons.

Typically the programming functionality will be implemented by the user selecting an option on a menu, such as "Program Buttons." Assuming the user has sufficient rights, i.e., the administrator allows them to reprogram their interface, or a portion thereof, the item will be selectable.

Some functions are programmed using freeform strings that allow text substitution of information from an active call. Table 3 illustrates sample variable names for a particular free form strings for programming various buttons.

TABLE 4

Programmable Button Functionality

| Button Function | Argument | Notes |
| --- | --- | --- |
| Set Agent ID | None | A dialog is launched that asks for Agent ID and password. The call manager knows the extension configured via TAPI. |
| Transfer to Agent | IsConsult (required) Agent ID (optional) | Allows transfer to a Contact Center agent by Agent ID. This supports hotel businesses. It launches a dialog if Agent ID is not supplied. |
| Answer CC Call | None | Assumes there is only one offering call regardless of media. It can be used to answer an incoming email, chat, or voice call. |
| Reinsert Busy Call | None | |
| Reinsert Unanswered Call | None | |
| Reinsert Terminated Call | None | |
| Login/Logout All Groups | None | This is a toggle button, and is not normally required. |
| Login/Logout Group | Group name (optional) | This is a toggle button which launches a dialog if group not supplied. |
| Resume/Release | None | This is a toggle button not normally required. |
| Release With Code | Code (optional) | This launches a dialog if code not supplied. |
| Wrap Up Code | Code (optional) | This launches a dialog if code not supplied. |
| Extend Wrap Up | None | This button is only enabled if in Wrap Up state. |
| End Wrap Up | None | This button only enabled if in Wrap Up state. |
| Supervisor Help | None | This is a toggle button. |
| Run Contact Center Application | Command string and working directory (required) | |

TABLE 3

Programmable Strings

| Name | Meaning |
|---|---|
| % AcctCode | Account Code attached to call |
| % AcctCodeName | name of Account Code attached to call |
| % Called | Called party number in canonical or extension format |
| % Caller | Calling party number in canonical or extension format |
| % CallID | Call GUID from switch, given in MS GUID format |
| % TAPICallID | TAPI 32-bit CallID |
| % Conn | Connected party number in canonical or extension format. If conference call, tab-delimited list. |
| % DNIS | DNIS |
| % Note | Call Note |
| % RouteSlip | Formatted routing slip text |
| % Start | Start time - time from which duration is counting |
| % State | Call State |
| % TimeConn | Timestamp of when call connection, HH:MM:SSS MM/DD/YYYY |
| % TimeHold | Timestamp of when call last went on hold, HH:MM:SSS MM/DD/YYYY (if call is on hold) |
| % TimeQueue | Timestamp of when call last went in queue, HH:MM:SSS MM/DD/YYYY (if call is in queue) |
| % TimeStamp | Timestamp of when button press was handled, HH:MM:SSS MM/DD/YYYY |
| % Trunk | Trunk info |

If the input string contains any variables, the button is only enabled if a call is selected; otherwise, it is grayed out. If the string for a function has no substitution strings, then it is always enabled.

The foregoing has been a description of a preferred embodiment. It will be appreciated that variations from the preferred embodiment will not depart from the scope of the invention as defined by the appended claims.

What is claimed is:

1. A system comprising:

a telephony system that includes a plurality of telephones;

a computing system that includes a plurality of computing devices separate from the plurality of telephones, where each of the plurality of computing devices is communicatively coupled with at least one of the plurality of telephones, each of the plurality of computing devices having a display associated therewith;

a user interface presented on the display of each of the plurality of computing devices, the user interface being associated with a user of a plurality of users, where for each user of the plurality of users an associated user interface includes:

(i) a first plurality of function defined user interface representations that are common to each user interface in the system, the first plurality of function defined user interface representations being provided on one or more first toolbars and being configured to direct an associated telephone of the plurality of telephones to perform telephony functions; and (ii) a second plurality of function defined user interface representations that are not common to each user interface in the system, the second plurality of function defined user interface representations being provided on one or more second toolbars and being configured to direct the associated telephone of the plurality of telephones to perform telephony functions and to direct an associated computing device of the plurality of computing devices to perform computer functions external to the telephony system, wherein:

the one or more first toolbars are different from the one or more second toolbars, the second plurality of function defined user interface representations are defined at a user or group level, the group level including less than the plurality of users, and the first plurality of function defined user interface representations are defined at a system level, where at least some of the second plurality of function defined user interface representations are defined to include a target, one or more target values to invoke associated functionality, and a state icon configured to indicate a status, the telephony functions of the second plurality of function defined user interface representations are different from the telephony functions of the first plurality of function defined user interface representations, at least some of the second plurality of function defined user interface representations cause a telephony function to be invoked that prompts the user for at least one of: a group name, a target code, or a target telephone number for execution of the telephony function, at least others of the second plurality of function defined user interface representations cause a computer function to be invoked that includes at least one of: executing a URL to invoke a program, opening a new window in a client application, or opening a new window on the display into which the user inserts information; and all of the second plurality of function defined user interface representations are stored in a remote database to enable the user interface presented on the display to be moved to another display associated with another computing device if the user logs off of the associated computing device and logs on to the another computing device.

2. A system as in claim 1 wherein the second plurality of function defined user interface representations comprise buttons.

3. A system as in claim 1 wherein the second plurality of function defined user interface representations display call activity for speed dial buttons.

4. A system as in claim 1 wherein the second plurality of function defined user interface representations change in appearance depending upon whether an active call is selected or not selected.

5. A system as in claim 1 wherein the second plurality of function defined user interface representations display a status icon representing at least one of telephony configuration and instant messenger presence.

6. A system as in claim 1 wherein the plurality of computing devices include personal computers.

7. A system as in claim 1 wherein the second plurality of function defined user interface representations is presented on a single toolbar.

8. A system as in claim 1 wherein the telephony functions invoked by the second plurality of function defined user interface representations include at least one of providing a chime for after-hours calls, paging a particular user, retrying a call later, calling a supervisor, leaving a message for an extension without ringing the extension, sending a flash signal from a trunk associated with a call, sending a Dynamic Data Exchange (DDE) message containing information from an active call, monitoring a particular extension, recording a call, or sending a recording to a particular extension.

9. A system comprising:
a plurality of telephones;
a plurality of computing devices separate from the plurality of telephones, where each of the plurality of computing devices is communicatively coupled with at least one of the plurality of telephones, each of the plurality of computing devices having a display screen associated therewith;
a user interface presented on the display screen of each of the plurality of computing devices, the user interface being associated with a user of a plurality of users, where for each user of the plurality of users an associated user interface includes:
 a first plurality of buttons, where each button of the first plurality of buttons is common to each user interface, the first plurality of buttons being provided on one or more first toolbars and being configured to direct an associated telephone of the plurality of telephones to perform telephony functions; and
 a second plurality of buttons, where each button of the second plurality of buttons is not common to each user interface, the second plurality of buttons being provided on one or more second toolbars and being configured to direct the associated telephone of the plurality of telephones to perform telephony functions and to direct an associated computing device of the plurality of computing devices to perform computer functions, wherein:
  the one or more first toolbars are different from the one or more second toolbars,
  the second plurality of buttons are defined at a user or group level, the group level including less than the plurality of users, and the first plurality of buttons are defined at a system level, where at least some of the second plurality of buttons are defined to include a target, one or more target values to invoke associated functionality, and a state icon configured to indicate a status,
  the telephony functions of the second plurality of buttons are different from the telephony functions of the first plurality of buttons,
  at least one of the second plurality of buttons cause a telephony function to be invoked that prompts the user for at least one of: a group name, a target code, or a target telephone number for execution of the telephony function,
  at least another one of the second plurality of buttons cause a computer function to be invoked that requires at least one of: executing a URL to invoke a program, opening a new window in a client application, or opening a new window on the display screen into which the user enters information; and
  all of the second plurality of buttons are stored in a remote database to enable the user interface to be moved to another display screen associated with another computing device if the user logs off of the associated computing device and logs on to the another computing device.

10. A system as in claim 9 wherein the plurality of computing devices include personal computers.

11. A system as in claim 9 wherein the second plurality of buttons is presented on a single toolbar.

12. A system as in claim 9 wherein the telephony functions invoked by the second plurality of buttons include at least one of providing a chime for after-hours calls, paging a particular user, retrying a call later, calling a supervisor, leaving a message for an extension without ringing the extension, sending a flash signal from a trunk associated with a call, sending a Dynamic Data Exchange (DDE) message containing information from an active call, monitoring a particular extension, recording a call, or sending a recording to a particular extension.

13. A method of providing a user of a telephone with a customizable user interface displayed on a display screen associated with a computing device, where the telephone is one of a plurality of telephones and the computing device is one of a plurality of computing devices, each computing device being communicatively coupled with at least one of the plurality of telephones and having a display screen associated therewith, where a user interface is presented on the display screen of each of the plurality of computing devices and each user interface is associated with a user of a plurality of users, where for each user interface the method comprises:
 providing a set of standard functions represented by first buttons on one or more toolbars on the user interface, the set of standard functions being configured to direct the telephone of the plurality of telephones to perform telephony functions;
 providing a set of non-standard functions represented by second buttons on one or more second toolbars on the user interface, the set of non-standard functions being configured to direct the telephone of the plurality of telephones to perform telephony functions and to direct an associated computing device of the plurality of computing devices to perform computer functions, wherein:
  the one or more first toolbars are different from the one or more second toolbars,
  the set of non-standard functions are defined at a user or group level, the group level including less than the plurality of users, and the set of standard functions are defined at a system level, where at least some of the set of non-standard functions are defined to include a target, one or more target values to invoke associated functionality, and a state icon configured to indicate a status,
  the telephony functions of the set of non-standard functions are different from the telephony functions of the set of standard functions,
  at least some of the set of non-standard functions cause a telephony function to be invoked that prompts the user for at least one of: a group name, a target code, or a target telephone number for execution of the telephony function,
  at least others of the set of non-standard functions cause a computer function to be invoked that includes at least one of: executing a URL to invoke a program, opening a new window in a client application, or opening a new window on the display screen into which the user enters information; and
  all of the set of non-standard functions are stored in a database to enable the user interface presented on the display screen to be moved to another display screen associated with another computing device if the user logs off of the associated computing device and logs on to the another computing device.

14. A method as in claim 13 wherein the plurality of computing devices include personal computers.

\* \* \* \* \*